(12) United States Patent
Green et al.

(10) Patent No.: US 9,744,604 B2
(45) Date of Patent: Aug. 29, 2017

(54) HACKSAW WITH BLADE TENSIONING MECHANISM

(71) Applicant: Irwin Industrial Tool Company, Huntersville, NC (US)

(72) Inventors: Matthew C Green, Amherst, MA (US); Joseph Novak, East Longmeadow, MA (US); Peter Weremchuk, Simsbury, CT (US)

(73) Assignee: IRWIN INDUSTRIAL TOOL COMPANY, Huntersville, NC (US)

( * ) Notice: Subject to any disclaimer, the term of this patent is extended or adjusted under 35 U.S.C. 154(b) by 225 days.

(21) Appl. No.: 14/538,293

(22) Filed: Nov. 11, 2014

(65) Prior Publication Data

US 2015/0059193 A1   Mar. 5, 2015

Related U.S. Application Data

(62) Division of application No. 12/626,377, filed on Nov. 25, 2009, now Pat. No. 8,881,411.

(60) Provisional application No. 61/118,573, filed on Nov. 28, 2008.

(51) Int. Cl.
  *B23D 49/12*   (2006.01)
  *B23D 51/12*   (2006.01)

(52) U.S. Cl.
  CPC ........... *B23D 49/12* (2013.01); *B23D 51/125* (2013.01)

(58) Field of Classification Search
  CPC ........ B23D 49/10; B23D 49/12; B23D 51/01; B23D 51/03; B23D 51/08; B23D 51/10; B23D 51/125
  USPC ...... 30/506, 507, 510, 512–514, 517; D8/96
  See application file for complete search history.

(56) References Cited

U.S. PATENT DOCUMENTS

| 37,999 A | 3/1863 | Bates |
| 120,123 A | 10/1871 | Sullenberger |
| 280,928 A | 7/1883 | Hoffman |
| 437,876 A | 10/1890 | Truax |
| 579,492 A | 3/1897 | Morrell |
| 686,399 A | 11/1901 | George |
| 739,457 A | 9/1903 | Tilden |
| 766,077 A | 7/1904 | Tilden |

(Continued)

FOREIGN PATENT DOCUMENTS

| CA | 2219532 | 4/1999 |
| DE | 2710990 | 9/1978 |

(Continued)

*Primary Examiner* — Jason Daniel Prone
(74) *Attorney, Agent, or Firm* — Eversheds Sutherland (US) LLP

(57) ABSTRACT

A hacksaw with an improved mechanism for applying and adjusting the tension on a blade mounted to a blade mount on a front arm and a blade mount on a rocker arm. The rocker arm is pivotally coupled to a handle and is spring biased to place an initial tension on a blade held by the rocker arm and the front arm. A rotatably mounted lever is positioned on the handle for vertically displacing a nut captured in the rocker arm to pivot the rocker arm and adjust the tension on the rocker arm-held blade. An elongate top frame bar of the hacksaw defines a hollow I-beam cross-section accessible from the face of the front handle and is capable of storing saw blades. A bale screw is positioned in the front member for securing the blades in a position extending past the front handle.

7 Claims, 14 Drawing Sheets

(56) References Cited

U.S. PATENT DOCUMENTS

| | | |
|---|---|---|
| 925,112 A | 6/1909 | Leland |
| 963,848 A | 7/1910 | Anderson |
| 1,080,365 A | 12/1913 | O'Neill |
| 1,094,939 A | 4/1914 | Smith |
| 1,113,591 A | 10/1914 | Wood |
| 1,129,595 A | 2/1915 | Onstine |
| 1,146,604 A | 7/1915 | Whitcomb |
| 1,187,460 A | 6/1916 | Jull |
| 1,252,424 A | 1/1918 | Gamage |
| 1,382,448 A | 6/1921 | Wilkins |
| 1,446,674 A | 2/1923 | Thompson |
| 1,517,827 A | 12/1924 | De Grado |
| 1,657,748 A | 1/1928 | Hanning |
| 1,663,076 A | 3/1928 | Garner |
| 1,713,972 A | 5/1929 | Lufkin |
| 1,797,108 A | 3/1931 | Torgerson |
| 1,806,702 A | 5/1931 | O'Neill |
| 1,810,349 A | 6/1931 | Green |
| 1,972,566 A | 9/1934 | Laemmel |
| 1,995,679 A | 3/1935 | Kelley |
| 2,034,625 A | 3/1936 | Lorusso |
| 2,194,494 A | 3/1940 | Carroll |
| 2,197,285 A * | 4/1940 | Wright et al. ......... A22B 5/205 30/510 |
| 2,226,614 A | 12/1940 | Kaspar |
| 2,308,354 A | 1/1943 | Clemson |
| 2,320,511 A | 6/1943 | Curry |
| 2,332,545 A | 10/1943 | Acomb |
| D140,810 S | 4/1945 | Collura |
| 2,388,655 A | 11/1945 | Lenk |
| 2,399,869 A | 5/1946 | Hough |
| 2,432,626 A | 12/1947 | Lenk |
| 2,435,964 A | 2/1948 | Graff |
| 2,436,743 A | 2/1948 | Carlson |
| 2,519,904 A | 8/1950 | Hendricksen et al. |
| 2,531,135 A | 11/1950 | Kulp |
| 2,546,660 A | 3/1951 | Wilcox |
| 2,602,478 A | 7/1952 | Carpentier |
| 2,606,585 A | 8/1952 | Collura |
| 2,613,709 A | 10/1952 | Terrill |
| 2,658,541 A | 11/1953 | Heuneman |
| 2,725,085 A | 11/1955 | Doherty et al. |
| 2,880,773 A | 4/1959 | Contreras et al. |
| 3,060,983 A | 10/1962 | Andreasson |
| 3,327,748 A | 6/1967 | Reuterfors |
| 3,329,187 A | 7/1967 | Cowley |
| 3,636,997 A | 1/1972 | Keymer |
| 3,822,731 A | 7/1974 | Keymer |
| D245,754 S * | 9/1977 | Breger ............................. D8/96 |
| 4,256,156 A | 3/1981 | Biszantz et al. |
| 4,349,059 A | 9/1982 | Hepworth et al. |
| 4,367,779 A | 1/1983 | Ewig |
| 4,466,471 A | 8/1984 | Thomson |
| D276,407 S | 11/1984 | Jacoff |
| 4,571,829 A | 2/1986 | Withers, Jr. |
| D318,006 S | 7/1991 | Wanner et al. |
| 5,074,002 A * | 12/1991 | Huang ................... B23D 51/03 30/512 |
| 5,388,333 A * | 2/1995 | Chen ....................... B23D 51/14 30/507 |
| 5,471,752 A | 12/1995 | Koetsch |
| 5,577,325 A * | 11/1996 | Bentley ................ B23D 61/123 30/506 |
| 5,673,488 A | 10/1997 | Grayo |
| 5,722,173 A * | 3/1998 | Huang .................... B23D 49/11 30/510 |
| 5,768,788 A | 6/1998 | Arnold |
| 5,826,344 A * | 10/1998 | Phelon ................ B23D 51/125 30/506 |
| D403,224 S * | 12/1998 | Martin ............................ D8/96 |
| 5,848,474 A * | 12/1998 | Fortney .................. B23D 51/10 30/392 |
| D409,892 S | 5/1999 | Juhlin |
| 6,070,330 A | 6/2000 | Phelon et al. |
| 6,079,109 A | 6/2000 | Ranieri |
| 6,134,791 A | 10/2000 | Huang |
| 6,158,131 A * | 12/2000 | Costanzo ............... B23D 51/03 30/506 |
| 6,266,887 B1 | 7/2001 | Owens et al. |
| D450,555 S | 11/2001 | Juhlin |
| D455,628 S | 4/2002 | Douglas |
| 6,457,244 B1 | 10/2002 | Huang |
| D475,600 S | 6/2003 | Huang |
| D477,519 S | 7/2003 | Seloron |
| D477,981 S | 8/2003 | Snider |
| 6,606,795 B2 | 8/2003 | Erisoty et al. |
| D479,113 S | 9/2003 | Douglas |
| D489,242 S * | 5/2004 | Snider ............................. D8/96 |
| 6,729,030 B2 | 5/2004 | Huang |
| D492,567 S | 7/2004 | Jimenez et al. |
| 6,772,522 B1 | 8/2004 | Huang et al. |
| 6,820,340 B1 | 11/2004 | Martin et al. |
| 6,820,341 B2 | 11/2004 | Snider |
| 6,925,720 B2 | 8/2005 | Ranieri |
| 6,925,970 B2 | 8/2005 | Liu |
| 7,174,644 B2 | 2/2007 | Critelli |
| 7,210,234 B2 | 5/2007 | Chen |
| D551,049 S | 9/2007 | Huang |
| 8,555,517 B2 | 10/2013 | Scott et al. |
| 8,763,260 B2 * | 7/2014 | Ranieri .................. B23D 51/10 30/512 |
| 8,776,385 B2 * | 7/2014 | Huang ................... B23D 49/12 30/506 |
| 8,881,411 B2 * | 11/2014 | Green ................. B23D 51/125 30/513 |
| 2003/0056377 A1 | 3/2003 | Huang |
| 2004/0020062 A1 | 2/2004 | Ducret |
| 2007/0028465 A1 | 2/2007 | Chen |
| 2009/0113729 A1 | 5/2009 | Chen |
| 2009/0265944 A1 | 10/2009 | Chao |
| 2010/0275453 A1 | 11/2010 | Huang |
| 2013/0276241 A1 | 10/2013 | Vanderbeek |
| 2013/0283540 A1 | 10/2013 | McDonough et al. |

FOREIGN PATENT DOCUMENTS

| | | |
|---|---|---|
| EP | 835710 A1 | 4/1998 |
| EP | 1000693 | 5/2000 |
| EP | 1512479 A2 | 3/2005 |
| FR | 2041556 | 1/1971 |
| FR | 2293277 | 7/1976 |
| GB | 2076738 | 12/1981 |

\* cited by examiner

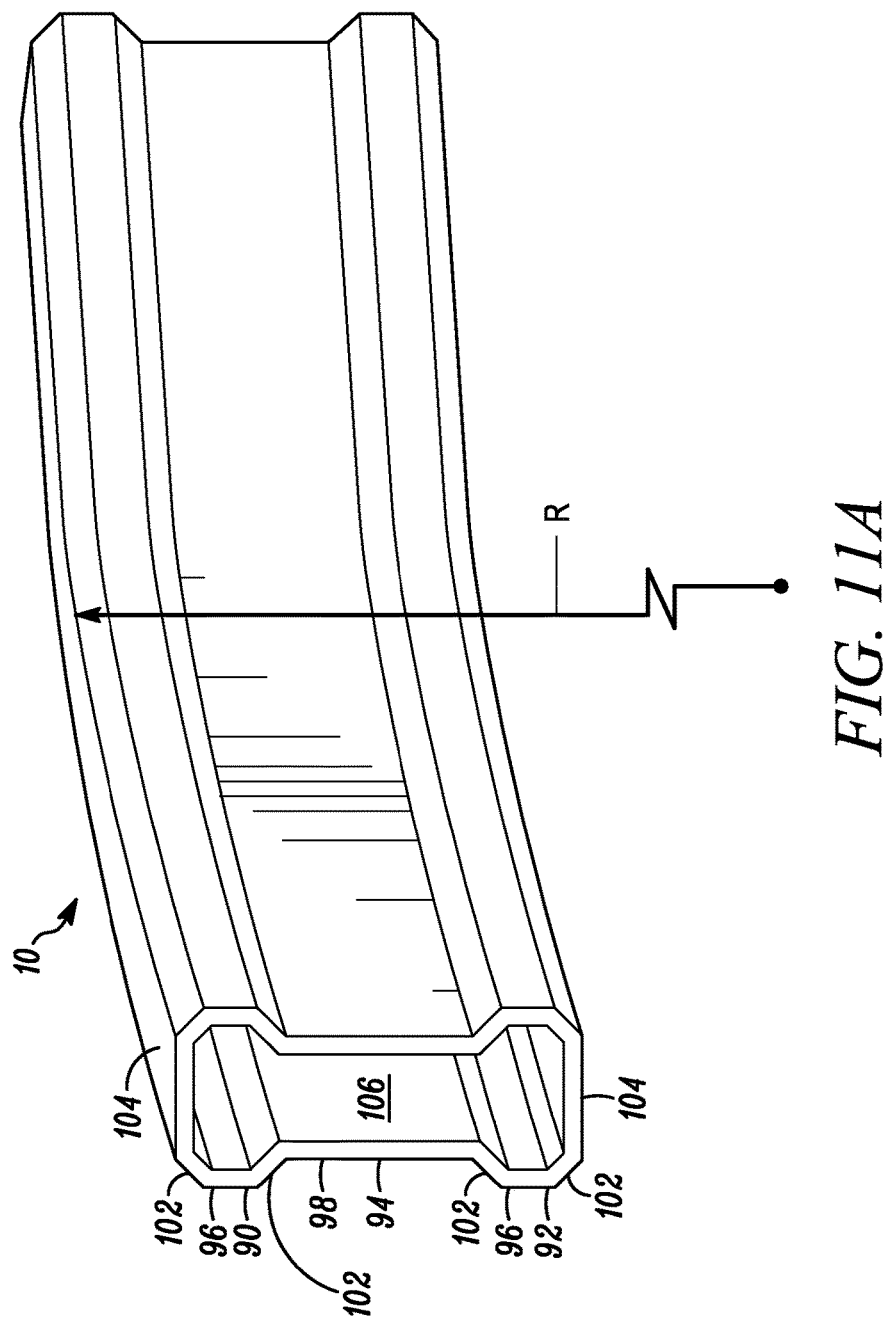

HACKSAW WITH BLADE TENSIONING MECHANISM

CROSS-REFERENCE TO RELATED APPLICATION

This application is a divisional application of U.S. patent application Ser. No. 12/626,377, filed Nov. 25, 2009 (now U.S. Pat. No. 8,881,411), which claims priority to U.S. patent application Ser. No. 61/118,573, filed Nov. 28, 2008, the contents of which are expressly incorporated by reference in their entirety as part of the present disclosure.

FIELD OF THE INVENTION

The present invention relates generally to hacksaws and, more particularly, to hacksaws with mechanisms for maintaining and adjusting the tension in hacksaw blades and/or hacksaws with hollow frames that may be used for storage of spare blades.

BACKGROUND

Conventional hacksaws include a frame with three main elements: a proximal handle, a distal handle, and an elongate top frame arm extending between the proximal and distal handles. The proximal and distal handles include blade mounts vertically spaced from the elongate top frame arm so that a hacksaw blade can be releasably coupled between the handles and define a usable cutting edge. Typically, one of the blade mounts is fixed while the other is movable in some manner to facilitate installation and tensioning adjustment of the blade.

In one typical arrangement, the movable blade mount is mounted to a threaded member on the proximal handle and the fixed blade mount is located on the distal handle. A wing nut or other similar mechanism rotatably engages the threaded member to effect movement of the movable blade mount toward or away from the fixed blade mount. In this manner, the distance between the respective blade mounts may be shortened to facilitate installation of a blade, or extended to apply tension to a blade. Tension on a blade helps keep the blade rigid to assist in straighter cuts and longer blade life. The prior art has provided more complex mechanisms that are intended to expedite blade change, provide better tension control, or both.

However, changing blades with some prior art mechanisms can be a relatively time consuming and/or difficult procedure. In addition, it can be difficult to maintain a relatively constant tension in the blades. Another drawback is that some prior art blade tensioning mechanisms include tensioning levers for tensioning the hacksaw blades that translate vertically with respect to the hacksaw frame when manipulated and, in turn, tend to interfere with the use of the hacksaw and/or become damaged. Prior art hacksaw blade tensioning mechanisms typically provide for a state of zero, negligible or negative tension on the blade during the blade changing process. One drawback associated with some such blade tensioning mechanisms is that the blades tend to pop off or otherwise disconnect from the blade mounts during blade changes. A further drawback is that some prior art hacksaws do not provide storage for extra blades, and, those which do, tend to do so in a manner that may structurally weaken the elongate top frame arm and/or provide a hacksaw frame that is less rigid than otherwise desired.

Accordingly, it is an object of the present invention to overcome one or more of the above described drawbacks and/or disadvantages of the prior art.

SUMMARY OF THE INVENTION

In accordance with a first aspect, the present invention is directed to a hack saw comprising a frame defining a proximal end and a distal end. A blade tensioning assembly of the hacksaw includes a manually engageable tensioning lever rotatably mounted on the proximal end of the frame, and an axially elongated tensioning rod fixedly connected to the tensioning lever and rotatable therewith. At least one of the tensioning lever and the tensioning rod is fixedly secured to a proximal end of the frame such that the tensioning lever and tensioning rod are substantially not movable axially relative to the proximal end of the frame, but are rotatable relative to the proximal end of the frame. A blade tensioning arm is movably mounted on the proximal end of the frame and distally spaced relative to the blade tensioning assembly. The blade tensioning arm includes a proximal blade mount for releasably mounting one end of a hack saw blade thereto, and is drivingly connected to the tensioning rod. A distal blade mount is fixedly secured to the distal end of the frame for releasably mounting another end of the hack saw blade thereto. A spring is coupled between the blade tensioning arm and the proximal end of the frame that normally biases the proximal blade mount of the blade tensioning arm substantially proximally and, in turn, tensions a hack saw blade mounted on the proximal and distal blade mounts. The tensioning lever is manually engageable and rotatable (i) in a first direction that drivingly engages the tensioning arm with the tensioning rod and moves the proximal blade mount of the tensioning arm substantially proximally from a first position applying a reduced level of tension to the hack saw blade to a second position applying a relatively increased level of tension to the hack saw blade, and (ii) in a second direction opposite the first direction that allows the proximal blade mount of the tensioning arm to move substantially distally from the second position applying the increased level of tension to the hack saw blade toward the first position applying the reduced level of tension to the hack saw blade. In the first position, the spring normally biases the proximal blade mount of the tensioning arm substantially proximally to releasably retain the blade on the blade mounts.

In some embodiments of the present invention, the blade tensioning arm is pivotally mounted to the proximal end of the frame, and the spring is connected between the blade tensioning arm and the proximal end of the frame to normally bias the tensioning arm in a substantially proximal direction. In some such embodiments, the spring is a leaf spring connected on one end to the blade tensioning arm and connected on the other end to the frame.

In some embodiments of the present invention, the blade tensioning arm defines a cavity on a proximal end thereof, and one end of the tensioning member is retained within the cavity. In some such embodiments, the blade tensioning assembly further includes a tensioning fastener connected to the tensioning member and retained within the cavity to drivingly connect the tensioning member to the tensioning arm. Preferably, the tensioning fastener is prevented from rotating within the cavity; however, relative axial movement of at least one of the tensioning member and fastener relative to the other is permitted. In some such embodiments, the tensioning fastener is a threaded fastener, the tensioning member includes a threaded shaft, and the threaded fastener is threadedly engaged with the threaded shaft. In some embodiments, in the first position the threaded fastener is permitted to float within the cavity, and in the second position the fastener engages a wall of the cavity. In some embodiments, the tensioning arm defines a first fastener engaging surface at one end of the cavity, and a second fastener engaging surface at an opposite end of the cavity. In the first position, the fastener is spaced between the first and second fastener engaging surfaces, and in the second position the fastener is engaged with one of the first and second fastener engaging surfaces.

In accordance with another aspect, the present invention is directed to a hack saw comprising first means defining a proximal end and a distal end and for supporting a hacksaw blade; second means mounted on the proximal end of the first means for manually rotating and applying tension to the blade; and third means pivotally mounted on the first means for releasably mounting a proximal end of the blade thereto. Fourth means are drivingly connected between the second means and the third means (i) for moving the third means substantially proximally from a first position applying a reduced level of tension to the hack saw blade to a second position applying a relatively increased level of tension to the hack saw blade with manual rotation of the second means in a first direction, and (ii) for allowing the third means to move substantially distally from the second position applying the increased level of tension to the hack saw blade toward the first position applying the reduced level of tension to the hack saw blade with manual rotation of the second means in a second direction opposite the first direction. Fifth means are provided for substantially preventing axial movement of the second and fourth means relative to the first means, but for permitting rotational movement of the second and fourth means relative to the first means. Sixth means are coupled between first means and the third means for normally biasing the third means substantially proximally and, in turn, tensioning and releasably retaining the hacksaw blade thereon in the second position.

In some embodiments of the present invention, the first means is a frame, the second means is a tensioning lever, the third means is a tensioning arm, the fourth means is a tensioning rod, the fifth means is a fastener, and the sixth means is a spring.

In accordance with another aspect, the present invention is directed to a hacksaw comprising a frame assembly including an upper frame member extending between proximal and distal ends thereof. The upper frame member defines a hollow I-beam cross-sectional configuration and an axially-elongated cavity formed therein. At least one of the proximal and distal ends of the frame defines a blade aperture in communication with the axially-elongated cavity for receiving at least one blade therethrough and into the axially-elongated cavity. The hollow I-beam frame defines a first expanded width hollow portion defining a first width and first length, and a second expanded width hollow portion defining a second width and a second length, and spaced from the first expanded width hollow portion. A reduced width hollow portion extends between the first and second expanded width portions, and defines a third width less than the first and second widths, and a third length greater than the first and second lengths.

In some embodiments of the present invention, the hollow I-beam further defines an axially-elongated arcuate shape. In some embodiments of the present invention, the hollow I-beam defines axially-elongated straight segments extending from the ends of ends of an axially-elongated arcuate shaped segment. In some embodiments of the present invention, the hacksaw further comprises a fastener extending laterally through a side wall of the frame and in communication with the axially-elongated cavity for (i) releasably retaining at least one blade within the cavity, and/or (ii) releasably engaging a blade wherein one end of the blade projects distally through the blade aperture and another end of the blade is received within the blade aperture and is engaged by the fastener to fixedly secure the blade in the distally projecting position.

One advantage of the hacksaw of the present invention is that it provides a tensioning mechanism that can allow for simple, effective, and/or safe blade tensioning and blade changes. Another advantage of the hacksaw of the present invention is that the tensioning lever is rotatable to adjust the tension applied to the blade, but is substantially prevented from vertical movement when rotated. A further advantage of a currently preferred embodiment of the present invention is that the hacksaw includes a hollow I-beam frame that permits blade storage therein while maintaining a relatively rigid frame in comparison to the above-described prior art hollow hacksaw frames.

Other objects, advantages and features of the present invention, and/or of the currently preferred embodiments thereof, will become more readily apparent in view of the following detailed description of the currently preferred embodiments and accompanying drawings.

BRIEF DESCRIPTION OF THE DRAWINGS

FIG. 11A is a perspective view of the top frame arm of the hacksaw of FIG. 1.

DETAILED DESCRIPTION OF CURRENTLY PREFERRED EMBODIMENTS

Figure 1:
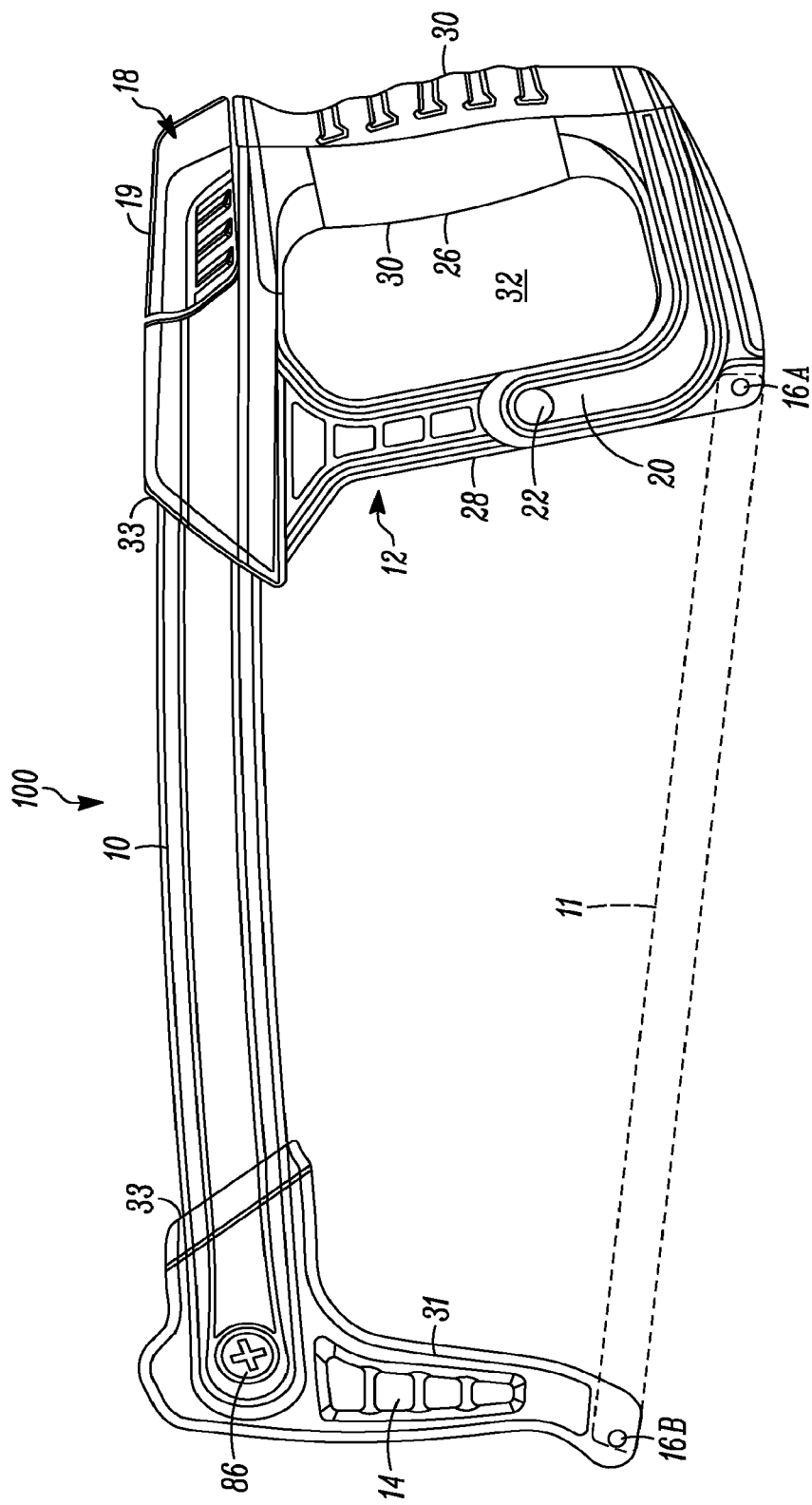
FIG. 1 is a side elevational view of a currently preferred embodiment of a hacksaw of the present invention.
Figure 2:
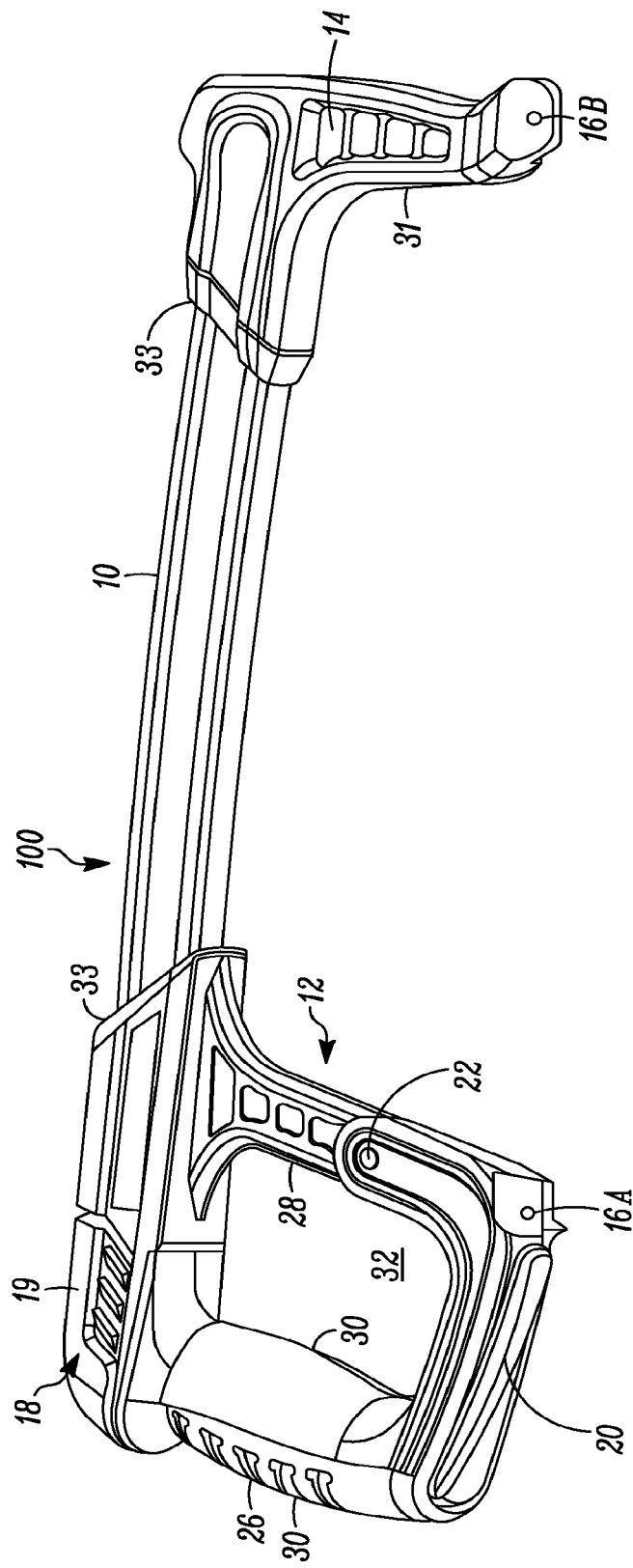
FIG. 2 is a perspective view the hacksaw of FIG. 1.

In FIGS. 1 and 2, a hacksaw embodying the present invention is indicated generally by the reference numeral 100. The hacksaw 100 is usable with elongate blades to cut workpieces. As shown in FIGS. 1 through 3, the hacksaw 100 comprises a frame including an elongate top frame arm 10, a proximal handle 12 fixedly secured to the proximal end of the top frame arm 10, and a distal handle and blade mount 14 fixedly secured to the distal end of the top frame arm 10. The proximal handle 12 includes a proximal blade mount 16A for mounting thereto one end of a blade 11 (shown in broken lines in FIG. 1), and the distal handle and blade mount 14 includes a distal blade mount 16B for mounting thereto the other end of the blade 11. The proximal handle 12 includes a blade tensioning assembly 18 for adjusting the tension applied to the blade 11 mounted to the blade mounts 16A, 16B. The blade tensioning assembly 18 includes a manually engageable blade tensioning lever 19 that is rotatably mounted at the top of the proximal handle 12. The proximal handle 12 includes a proximal grip 26 extending downwardly from the proximal end of the upper frame arm 10, and a hand guard 28 spaced distally relative to the proximal grip 26 and defining a grip aperture 32 therebetween. A rocker arm 20 is pivotally mounted to the hand guard 28 by a pivot pin defining a pivot point 22. As described further below, rotation of the tensioning lever 19 pivots the rocker arm 20 to, in turn, adjust the tension in the blade 11 extending between the blade mounts 16A, 16B. A spring 24 is coupled between the rocker arm 20 and the hand guard 28 to normally bias or urge the rocker arm 20 substantially proximally and, in turn, apply tension the hacksaw blade mounted on the blade mounts 16A, 16B.

Figure 3A:
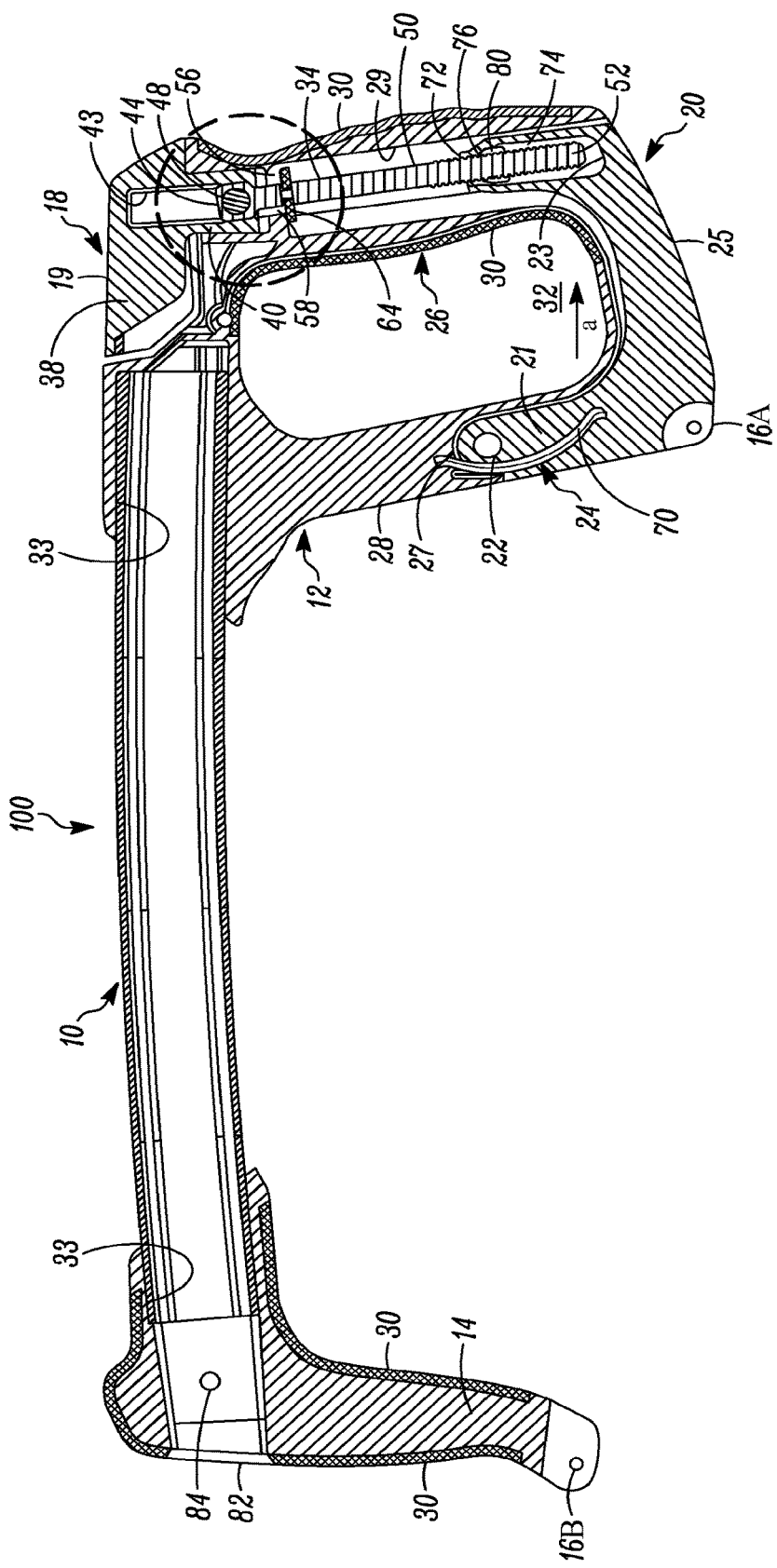
FIG. 3A is a cross-sectional view of the hacksaw of FIG. 1.
Figure 3B:
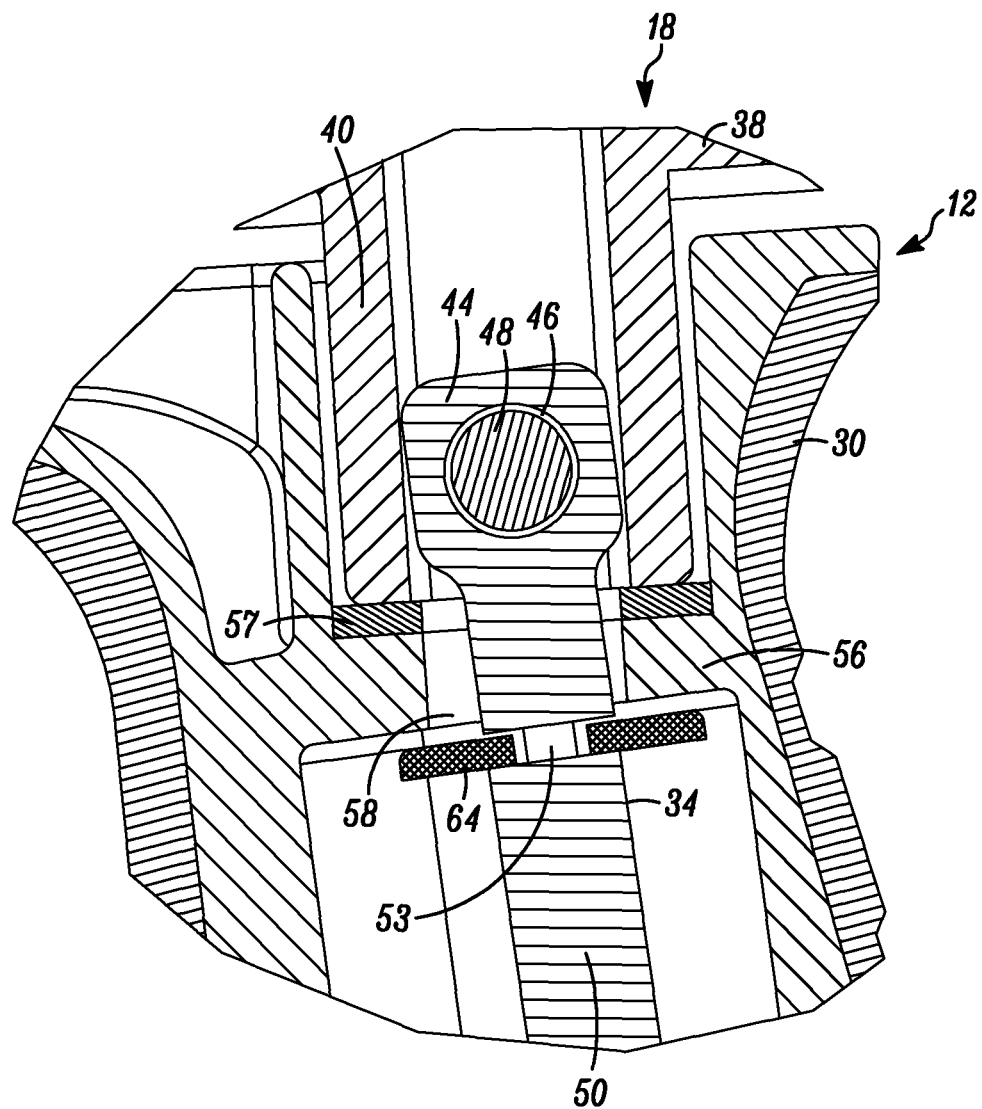
FIG. 3B is a partial, enlarged, cross-sectional view of the blade tensioning mechanism of the hacksaw of FIG. 3A illustrating in further detail the threaded tensioning rod and the lock washer that substantially prevents vertical or axial movement of the tensioning rod when the tensioning lever is rotated.
Figure 4:
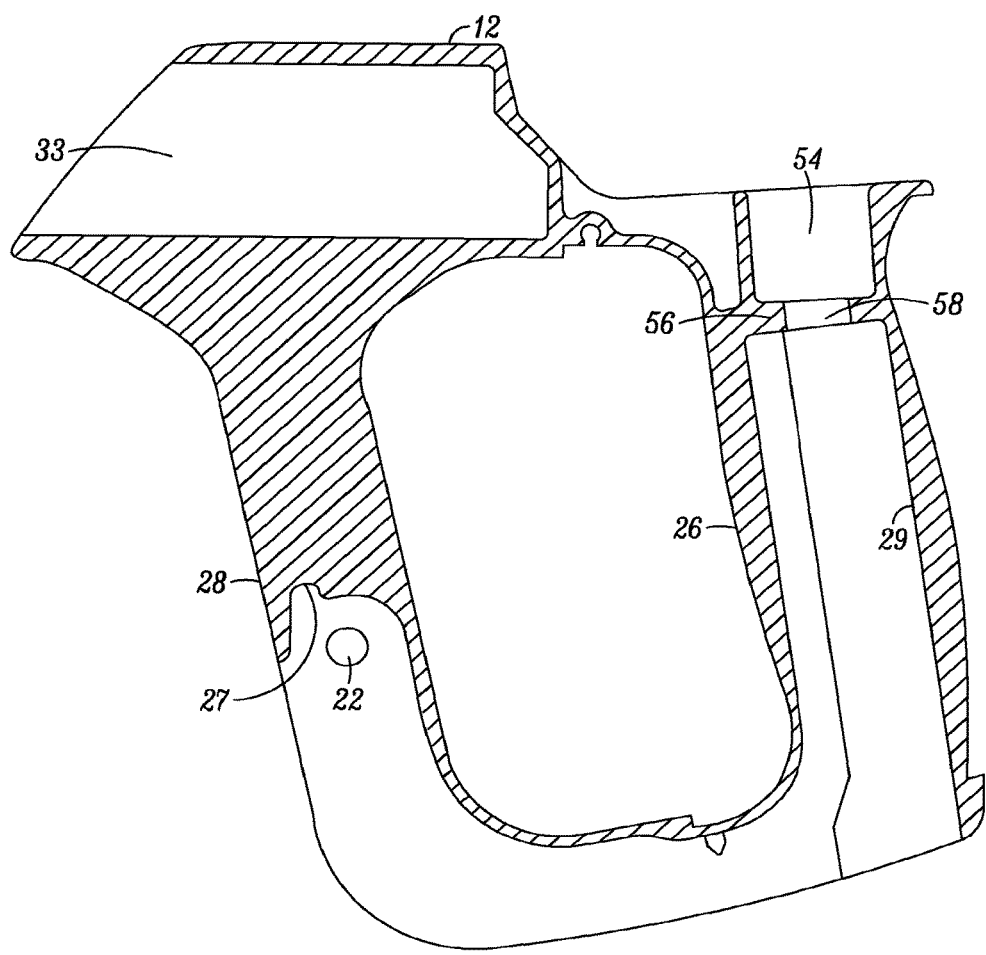
FIG. 4 is a cross-sectional view of the proximal handle of a hacksaw of FIG. 1.

As shown in FIGS. 3 and 4, the proximal handle 12 is sized and shaped so that an ordinary user can manually grasp the grip 26 with sufficient clearance between the user's hand (or fingers) and the hand guard 28. In use, a user manually grasps the grip 26 and applies push and pull strokes to the hacksaw 100 to cut a workpiece. The hand guard 28 protects the user's hand from the workpiece, debris or the like when the saw is in use. A gripping surface 30 is formed on the grip 26 and provides a ribbed and/or cushioned surface to facilitate manual gripping of the proximal handle 12. If desired, the gripping surface 30 may be formed of rubber or a like elastomeric material, or if desired, may be made of a hard plastic or metal. As may be recognized those of ordinary skill in the pertinent art based on the teachings herein, the gripping surface 30 may be formed of any of numerous different materials, and may take the form of any of numerous different surface configurations, that are currently known, or that later become known.

The proximal handle 12 further defines a frame arm opening 33 that is shaped and dimensioned to slidably receive therein the proximal end of the top frame arm 10 to fixedly secure the top frame arm thereto. In the illustrated embodiment, a glue (not shown) is applied to the interface of the top frame member 10 and frame arm opening 33 to fixedly secure the top frame arm and proximal handle to each other. However, as may be recognized by those of ordinary skill in the pertinent art based on the teachings herein, any of numerous other means may be employed for fixedly securing the top frame arm 10 to the handle 12, such as welds, rivets, screws, nails, other fasteners and/or clips, or by forming the top frame arm integral with the proximal handle, such as by molding or co-molding the two components.

Figure 5:
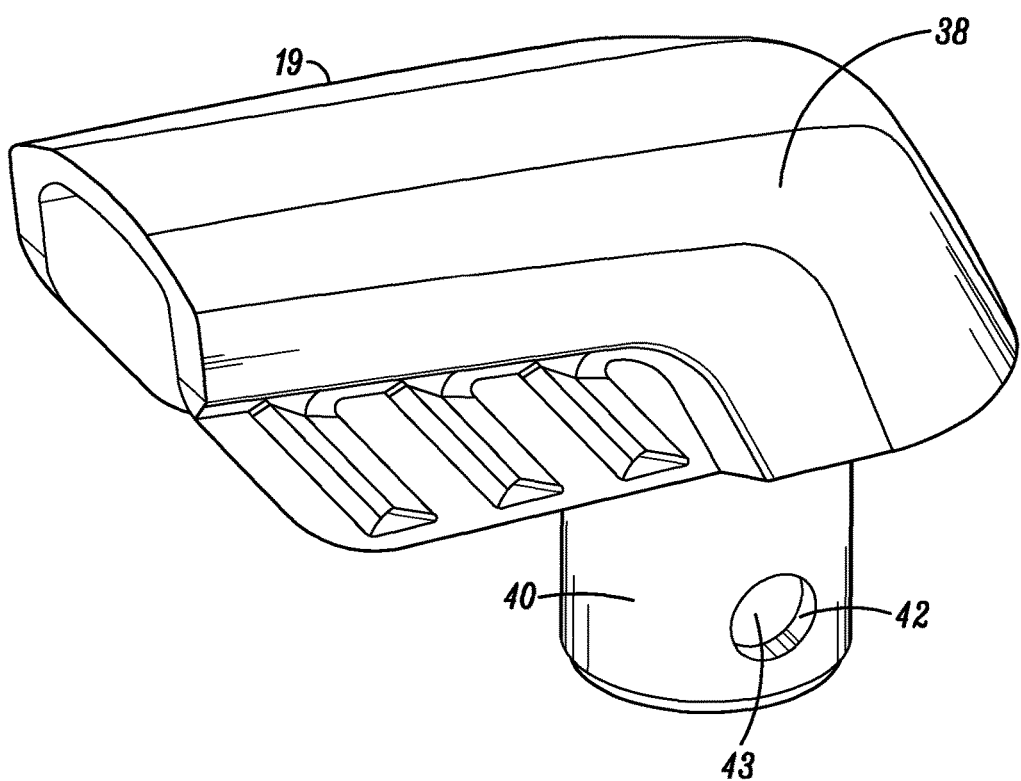
FIG. 5 is a perspective view of the tensioning lever of the hacksaw of FIG. 1.

The proximal handle 12 further defines an opening or hollow chamber 29 extending axially within the grip 26 to receive and otherwise accommodate the tensioning assembly 18. As shown in FIG. 5, the tensioning lever 19 resembles a mushroom shape and defines a manually-engageable head 38 and a stem 40 depending from the head. As can be seen, the head 38 defines an elongated, somewhat oval shape, and is not centered on the stem 40. The elongate shape and dimensions of the lever head 38 facilitate manual gripping and rotation thereof about the axis of the stem 40. In the illustrated embodiment, the stem 40 is substantially cylindrical to provide a base for the lever, and an axis of rotation about which the lever rotates for adjusting the tension of the blade 11. As shown best in FIG. 3A, the tensioning lever 19 further defines an interior cavity 43 that extends axially through the stem 40 and into the interior of the head 38 for receiving therein a head 44 of a tensioning rod 34. As shown in FIG. 5, a fastening aperture 42 extends through the base of the stem 40 for receiving therethrough a fastening pin 48 to fixedly connect the head 44 of the tensioning rod 34 to the tensioning lever 19 and, in turn, allow manual rotation of the tensioning rod 34 by the tensioning lever 19.

Figure 6:
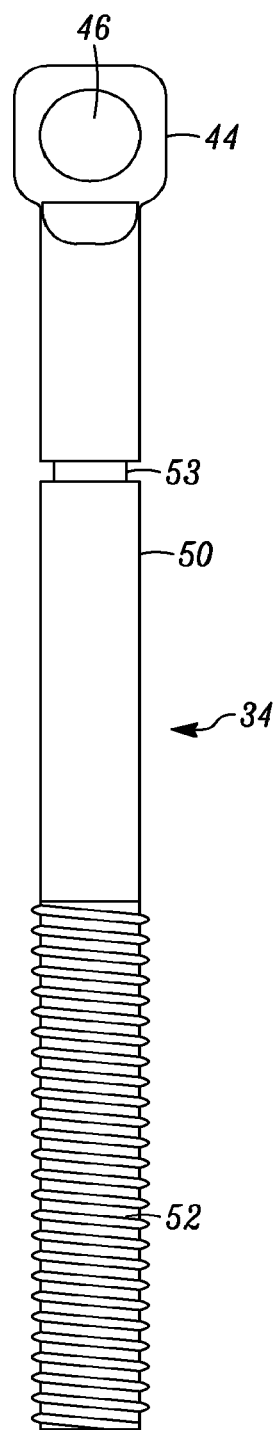
FIG. 6 is a side elevational view of the tensioning rod of the hacksaw of FIG. 1.

As shown in FIG. 6, the tensioning rod 34 defines a non-cylindrical or substantially flat head 44, a tensioning rod aperture 46 formed through the head 44, and a tensioning shaft 50 extending axially from the head. As described above, the head 44 of the tensioning rod 34 is inserted into the cavity 43 of the stem 40 in a position such that the stem aperture 42 and tensioning rod aperture 46 align and allow for insertion of the pin 48 therethrough. The pin 48 prevents the tensioning lever 19 from disengaging from the tensioning rod 34, and prevents relative rotation of the tensioning lever and tensioning rod. As shown in FIG. 3A, the tensioning rod 34 is hidden within the cavity 29 defined by the proximal grip 26, and the tensioning lever 19 is exposed at the top of the proximal handle 12. Accordingly, a user can manually grasp and rotate the tensioning lever 19 to effectuate rotation of the tensioning rod 34 and, in turn, adjust the tension in the blade 11.

As shown best in FIG. 6, the tensioning rod 34 further defines a threaded portion 52 located at the opposite end of the shaft 50 relative to the head 44, and a non-threaded portion extending between the threaded portion 52 and the head 44. If desired, the threaded portion 52 may extend along the entire length of the shaft 50, or the relative axial lengths of the threaded and non-threaded portions may differ from that shown. As shown in FIGS. 3B and 6, the tensioning rod 34 further defines a groove 53 extending around the periphery of the shaft 50 immediately adjacent or contiguous to the underside of the flange 56 to facilitate the coupling of a washer or clip to the shaft 50. As may be recognized by those of ordinary skill in the pertinent art based on the teachings herein, the particular tensioning rod 34 described herein is only exemplary, and any of numerous other types of tensioning members that are currently known or that later become known equally may be employed, including tensioning rods that do not threadedly engage a rocker arm, but rather frictionally engage the rocker arm.

The proximal handle 12 defines three distinct areas in the grip 26 for housing and interacting with the components of the tensioning assembly 18. As shown in FIG. 4, the proximal handle 12 defines a substantially cylindrical lever cavity 54 formed in the upper end thereof for receiving therein the stem 40 of the tensioning lever 19, an inwardly projecting flange 56 formed between the lever cavity 54 and the tensioning rod cavity 29 formed in the grip 26, and a flange aperture 58 formed through the flange 56. The flange 56 defines the bottom wall of the lever cavity 54 and the top wall off the tension rod cavity 29, and the flange aperture 58 defines a diameter or width that is smaller than that of the stem 40 and the head 44 of the tensioning rod 34, but large enough to allow the shaft 50 of the tensioning rod 34 to pass therethrough. The tensioning rod cavity 29 extends from the flange 56 through the proximal grip 26 and defines an accessible opening at the base of the grip 26. As shown in FIG. 3B, the threaded portion 52 of the tensioning rod 34 is at least partially present in the lower most portion of the tensioning rod cavity 29 for coupling to the rocker arm, as described further below.

As shown best in FIG. 3B, the tensioning assembly 18 further includes a lock washer 64 connected to the shaft 50 in the groove 53 immediately adjacent or contiguous to the underside of the flange 56 to allow rotation of the tensioning rod 34 with the tensioning lever 19, but to engage the underside of the flange and thereby prevent vertical movement of the tensioning rod 34 when the tensioning lever 19 is rotated. A washer 57 is seated between the base of the stem 40 of the tensioning lever 38 and the flange 56 to facilitate rotation of the tensioning lever relative to the flange.

Figure 7A:
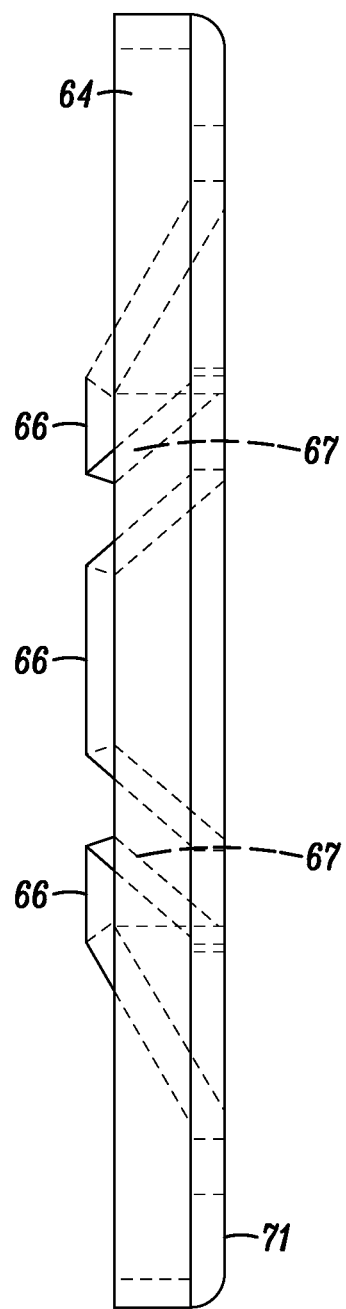
FIGS. 7A and 7B are a side elevational view and a top plan view, respectively, of the lock washer of FIG. 3B that prevents axial movement of the tensioning rod with rotation of the tensioning lever.
Figure 7B:
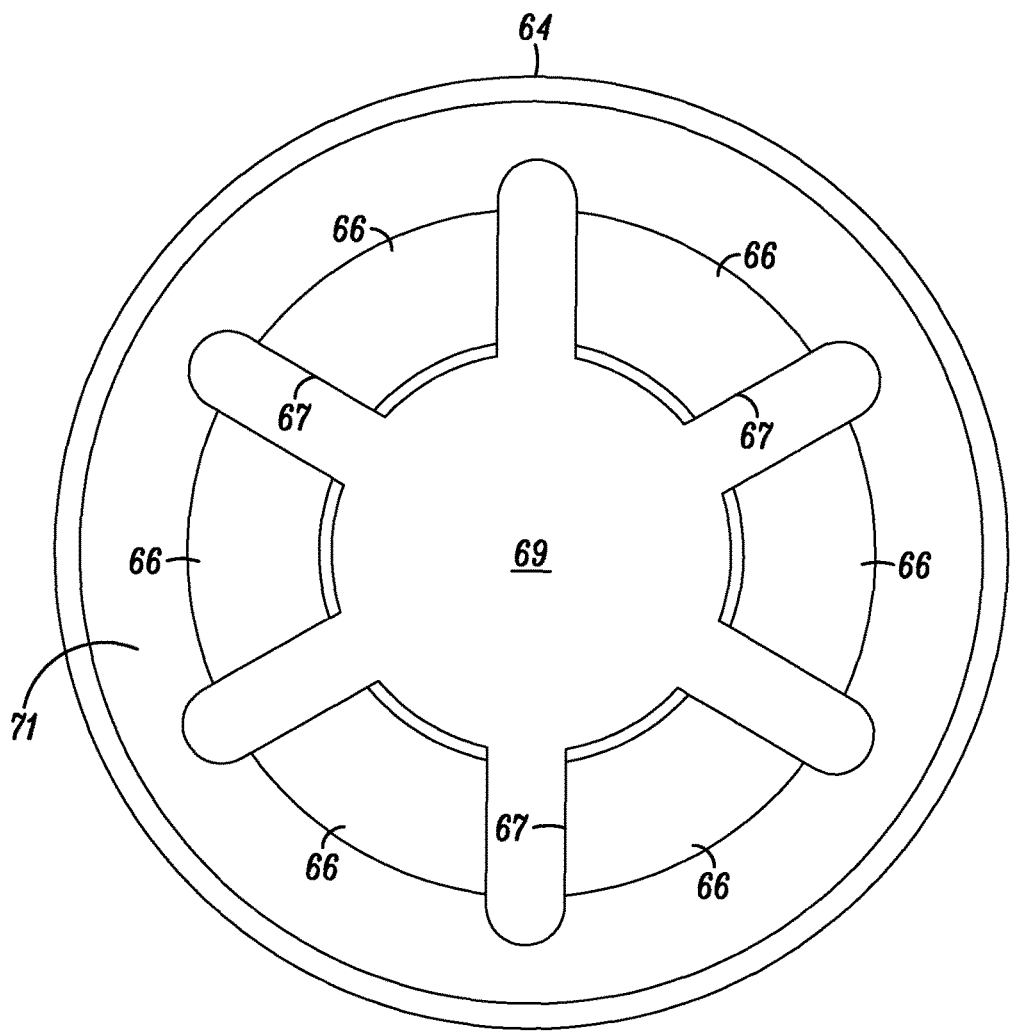

As shown in FIGS. 7A and 7B, in the illustrated embodiment, the lock washer 64 is a star lock washer that defines a plurality of inwardly or radially projecting tabs 66 that are angularly spaced relative to each other with radially extending slots 67 formed therebetween. A central aperture 69 is defined by the inner edges of the tabs 66 and is shaped and dimensioned to receive therethrough and engage the shaft 50 of the tensioning rod 34. As shown in FIGS. 7A and 7B, the tabs 66 slope inwardly and downwardly at an acute angle relative to an upper surface 71 of the washer 64. Accordingly, the angular orientation of the tabs 66 allows the tabs 66 to deflect and the star lock washer 64 to slidably receive therethrough the shaft 50 of the tensioning rod 34 until the tabs 66 enter the groove 53 to fixedly attach the star lock washer to the shaft 50 at the groove 53. When the tabs 66 are positioned in the groove 53, the star lock washer 63 is prevented from translating on the shaft (i.e., the tabs and groove prevent the washer from being slidably removed from the shaft). In the illustrated embodiment of FIG. 3B, the washer 64 is incapable of translating down the shaft 50 under normally expected forces because the deflectable tabs are positioned in groove 53 of the shaft 50. Accordingly, if an upward force is applied to the tensioning rod 34 (such as during rotation of the tensioning lever 19) the star lock washer 64 engages the underside of the flange 56 and the inner ends of the tabs 66 are held in the groove 53 of the shaft 50 to prevent axial movement of the shaft upwardly through the flange. Similarly, if a downward force is applied to the tensioning lever 19 or tensioning rod 34, the stem 40 of the tensioning lever 19 engages the washer 57 to prevent downward movement of the tensioning lever and/or tensioning rod. Accordingly, the star lock washer 64 and tensioning lever 19 cooperate with the flange 56 to permit rotational movement, but to prevent axial movement of the tensioning lever and tensioning rod. As may be recognized by those of ordinary skill in the pertinent art based on the teachings herein, the device(s) for preventing axial or vertical movement, but permitting rotational movement, of the tensioning lever and tensioning rod, may take any of numerous different configurations that are currently known, or that later become known. For example, the washer may be prevented from translating down the shaft under normally expected forces, at least in part, because the deflectable tabs "dig" into the shaft in an effort to deflect to a position that otherwise would allow the washer to slide down the shaft 50. For another example, rather than a star lock washer, a c-clip or other type of fastener may be fixedly secured to the shaft, such as by receiving the c-clip in a circumferential groove formed in the shaft, to allow rotation of the shaft by preventing axial movement of the shaft through the flange aperture.

Figure 8:
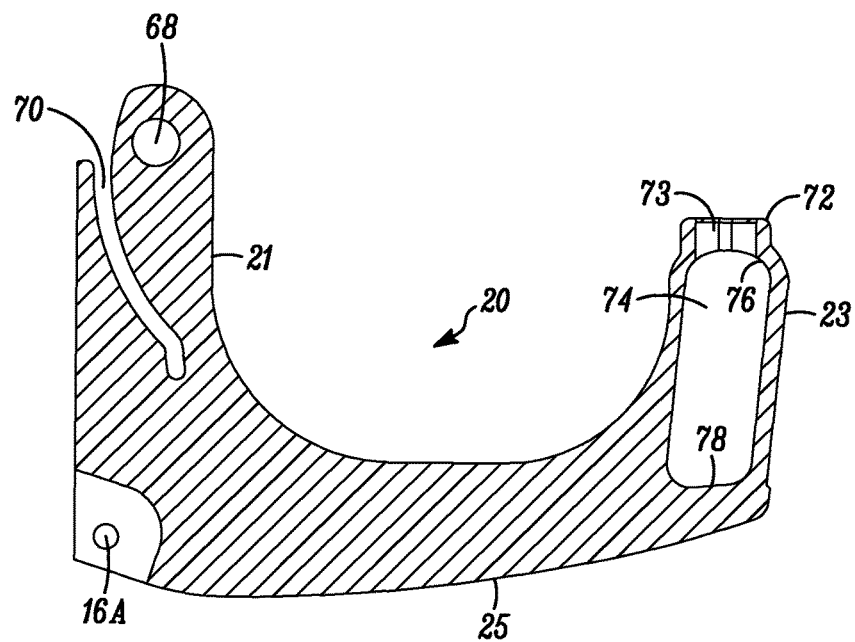
FIG. 8 is a cross-sectional view of a tensioning rocker arm of the hacksaw of FIG. 1.

As shown in FIG. 3A, the tensioning rocker arm 20 is pivotally connected to the hand guard 28 by a pivot pin defining a pivot point 22. As shown in FIG. 8, the rocker arm 20 is generally u-shaped, and includes a first vertically extending leg 21 that is pivotally connected to the hand guard 28, a second vertically extending leg 23 laterally spaced relative to the first leg 21, and a laterally extending leg 25 extending between the first and second legs 21 and 23, respectively. As shown in FIG. 3A, when mounted on the proximal handle 12, the first leg 21 extends in a downward direction along the hand guard 28, the third leg 25 extends proximally toward the grip 26, and the second leg 23 extends in an upward direction along the grip 26. As shown in FIG. 3A, the second leg 23 is received within the lower accessible opening of the tensioning rod cavity 29 for coupling the rocker arm to the tensioning rod, as hereinafter described.

Figure 9:
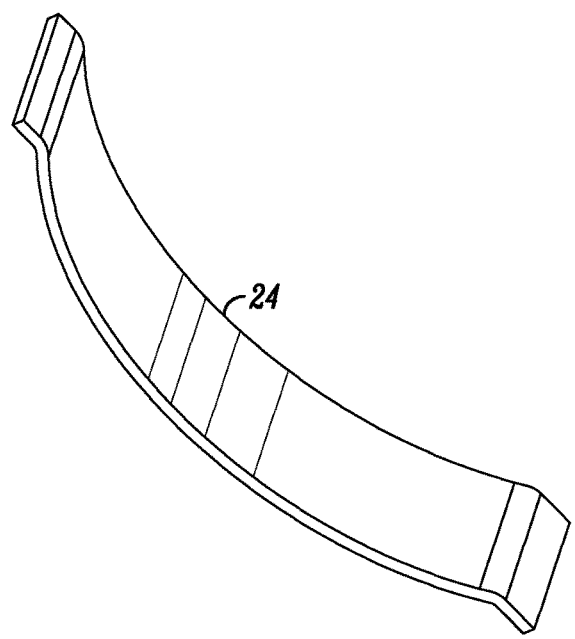
FIG. 9. is a perspective view of the tensioning spring of the hacksaw of FIG. 1.
Figure 10A:
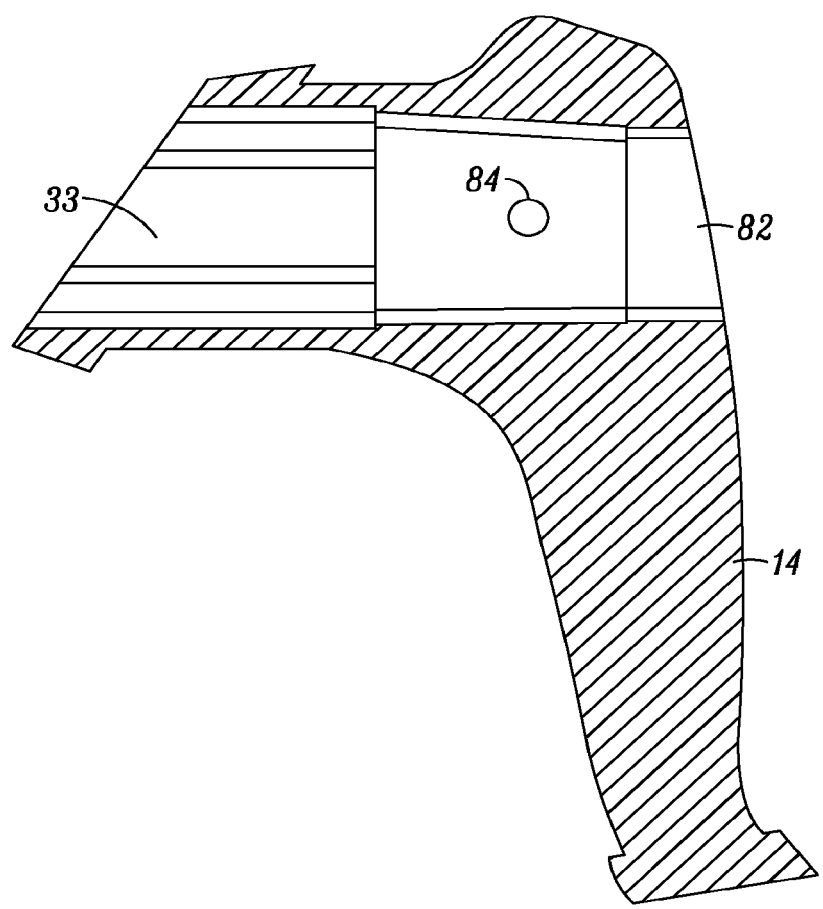
FIG. 10A is a perspective view of the distal handle and blade mount of the hacksaw of FIG. 1.
Figure 10B:
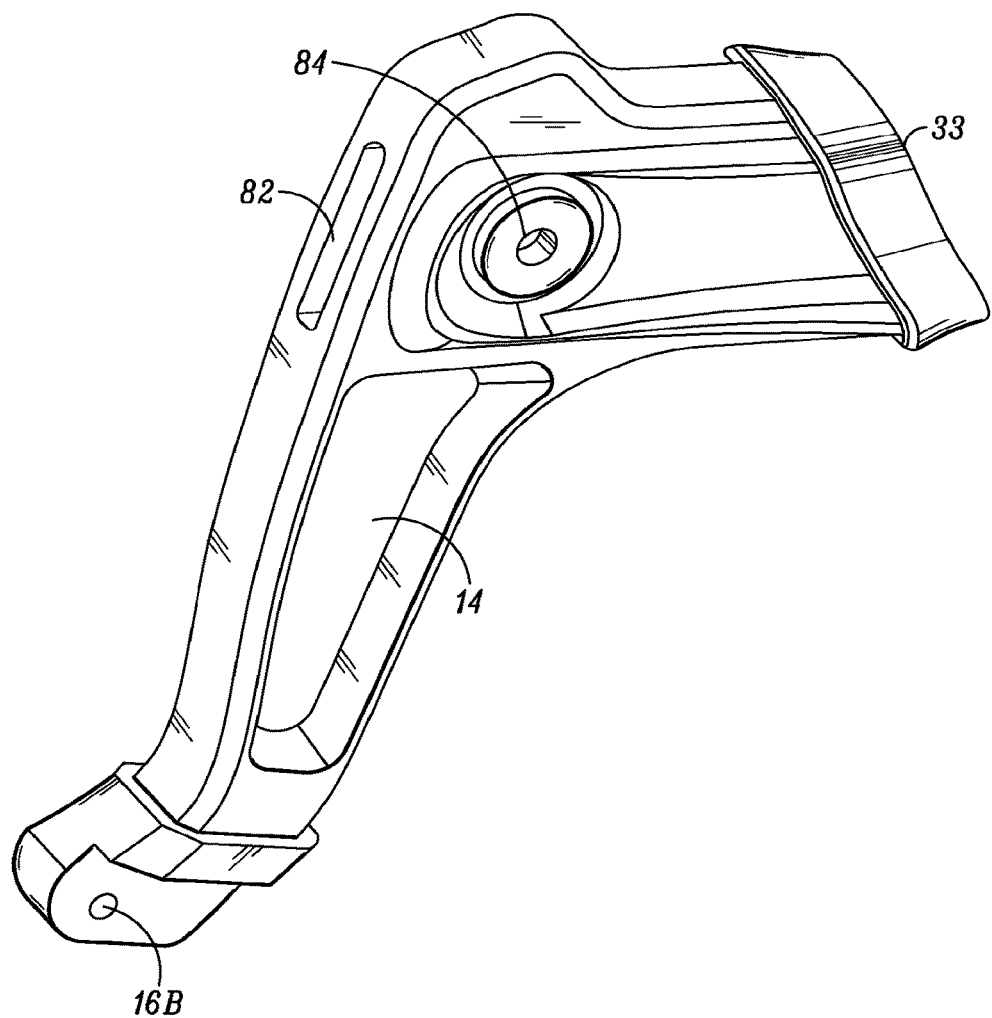
FIG. 10B is a cross-sectional view of the distal handle and blade mount of FIG. 10A.

As shown best in FIG. 8, the rocker arm 20 defines a curvilinear spring channel 70 that is shaped and dimensioned to receive therein a spring 24 (FIG. 9). As shown in FIG. 9, in the illustrated embodiment, the spring 24 is a leaf spring. The leaf spring 24 defines a slender arc-shaped length of spring-like material defining a rectangular periphery. As shown in FIG. 3A, one end of the spring 24 is received within a spring recess 27 of the hand guard 28 (FIG. 4) and the opposite end of the spring 24 is received within the spring channel 70 of the rocker arm 20 to seat the spring between the proximal handle and rocker arm. Depending upon the direction in which the rocker arm 20 is pivoted, and the degree to which the rocker arm is pivoted in that direction, the spring 24 will bias the rocker arm in the opposite direction. In the illustrated embodiment, and as indicated by the arrow "a" in FIG. 3A, the spring 24 normally biases the rocker arm about the pivot point 22 in a substantially proximal direction in order to apply a proximally directed tension to the blade 11 and, in turn, prevent the blade from falling off of, or otherwise releasing itself from the blade mounts upon loosening the tensioning lever 19.

As shown in FIG. 8, the second leg 23 of the rocker arm 20 defines on its upper end a boss 72 including an aperture 73 formed therethrough and in communication with a tensioning nut cavity 74 formed within the second leg 23. The inner end of the boss 72 is defined by a curvilinear surface 76. As shown in FIG. 3A, the lower end of the shaft 50 of the tensioning rod 34 is received through the aperture 73 of the boss 72, and a tensioning nut 80 is received within the tensioning nut cavity 74 and threadedly engaged to the shaft 50 to thereby connect the tensioning rod 34 to the rocker arm 20. The side walls forming the nut cavity 74 preferably define a peripheral shape corresponding to the peripheral shape of the tensioning nut 80 received therein (e.g., a square or other rectilinear shape) to prevent rotation of the nut within the cavity. As shown in FIG. 8, the second leg 23 of the rocker arm 20 further defines a bottom surface 78 that is axially spaced from the curvilinear surface 76 to define the axial extent of the tensioning nut cavity 74 therebetween. As shown in FIG. 3A, the tensioning nut 80 is captured within the cavity 74 between the curvilinear surface 76 and the bottom surface 78 in such a manner as to allow vertical displacement or translation of the tensioning nut 80 along the threaded shaft 50 while restricting rotational movement of the nut to thereby allow the shaft to be rotated relative to the nut. As indicated above, the non-cylindrical inner periphery of the nut cavity 74 and the non-cylindrical outer periphery of the nut 80 prevent rotation of the nut within the nut cavity. Axial translation of the nut 80 within the rocker arm 20 is limited to the axial extent of the nut cavity 74 extending between the curvilinear surface 76 and the bottom surface 78. As shown in FIG. 3A, the upper surface of the tensioning nut 80 substantially conforms in shape to the curvilinear surface 76 of the rocker arm to facilitate smooth contact therebetween when engaging each other. The tensioning nut 80 includes threads along its inner periphery that threadedly engage the threaded portion 52 of the tensioning rod 34. The arcuate shape of the upper surface of the nut 80 and curvilinear surface 76 allow the two surfaces to abut one another (see FIG. 3A) and, in turn, facilitate smooth axial displacement of the rocker arm and shaft relative to each other during rotation of the tensioning lever 19 and tensioning rod 34. As may be recognized by those of ordinary skill in the pertinent art based on the teachings herein, the rocker arm and/or the features of the rocker arm may take any of numerous different configurations that are currently known, or that later become known. For example, in one alternative embodiment the rocker 20 may define a flange projecting into the nut cavity 74 to, for example, allow for decreased axial movement of the nut 80 relative to the tensioning rod 34 between the curvilinear surface 76 and the flange, or between the bottom surface 78 and the flange.

In operation, when the tensioning lever 19 and the tensioning rod 34 are rotated in a first direction for tensioning the blade 11, the nut 80 moves axially along the tensioning rod 34 within the nut cavity 74 of the rocker arm 20. When the nut 80 contacts the upper surface 76 of the nut cavity 74, further rotation of the tensioning lever 19 in the first direction pivotally drives the rocker arm 20 about the pivot point 22 in a substantially proximal direction, as indicated by the arrow "a" in FIG. 3A, to apply a tension to the blade 11 mounted on the blade mounts 16A, 16B. Accordingly, the desired level of tension is achieved in the blade 11 by rotating the tensioning lever 19 in the first direction. As indicated above, one advantage of the hacksaw 100 is that the tensioning lever 19 and tensioning rod 34 are substantially prevented from moving vertically (or axially) during rotation of the tensioning lever.

In order to reduce the tension in the blade 11, and/or to release the blade 11 from the blade mounts 16A, 16B to, for example, replace the blade, the tensioning lever 19 is rotated in a second direction that is opposite the first direction. As the tensioning lever 19 is rotated in the second direction, the tension in the blade 11 causes the rocker arm 20 to pivot substantially distally (in the opposite direction of the arrow "a" in FIG. 3A) to, in turn, reduce the level of tension in the blade. Continued rotation of the lever arm 19 in the second direction causes the rocker arm 20 to reach a blade release position or state wherein the only tension applied to the blade 11 is the tension applied by the spring 24. In the blade release state, the nut 80 is preferably disengaged from the curvilinear surface 76 of the nut cavity 74 and spaced within the nut cavity between the curvilinear surface 76 and the bottom surface 78. Continued rotation of the tensioning lever 19 in the second direction when the rocker arm 20 is in the blade release state will not further decrease the tension in the blade because the spring 24 maintains a substantially constant proximally directed spring force on the rocker arm. In the blade release state, the nut 80 is "floating" within the tensioning nut cavity 74 of the rocker arm and the spring 24 is applying the only proximally directed force to the blade to tension the blade. The proximally directed spring force applied to the rocker arm 20 is sufficient to prevent the blade 11 from falling off of, or otherwise releasing itself from the blade mounts 16A, 16B. In order to release the blade 11 from the blade mounts 16A, 16B with the rocker arm in the blade release state, a user can manually grip the rocker arm 20, such as at the third leg 25 of the rocker arm, and pivot the rocker arm inwardly or distally against the bias of the spring 24 to, in turn, release the blade from the blade mounts 16A, 16B. As the user pulls the rocker arm 20 inwardly or distally against the bias of the spring 24, the blade 11 will either fall off of, or the user may manually grip and remove the blade from the blade mounts 16A, 16B. Then, a new blade 11 may be attached to the blade mounts 16A, 16B by manually gripping the rocker arm, pivoting the rocker arm inwardly or distally against the bias of the spring 24, and attaching the new blade 11 to the blade mounts 16A, 16B. After the new blade 11 is seated on the blade mounts 16A, 16B, the user may release the blade, and the spring 24 will maintain a sufficient proximally directed force on the rocker arm 20 to substantially prevent the blade 11 from falling off of the blade mounts 16A, 16B. Then, the user rotates the tensioning lever 19 in the first direction to tension the blade as described above.

As shown in FIGS. 1 through 3 and 10, the distal handle and blade mount 14 includes the distal blade mount 16B for mounting thereto the distal end of the blade 11, and a distal grip 31 for manually gripping the distal handle during use. The distal grip 31 may take the form of any of numerous different grips, and may be formed of any of numerous different materials, in any of numerous different configurations, that are currently known or that later become known. As shown best in FIG. 10B, the distal handle and frame mount 14 defines on its proximal side a frame arm recess 33 that is dimensioned and configured to receive therein the distal end of the top frame arm 10 to fixedly secure the top frame arm to the distal handle. The top frame arm 10 is fixedly secured to the distal arm 14 at the recess 33 by, for example, an adhesive or glue applied to the interface of the frame arm and recess. However, as may be recognized by those of ordinary skill in the pertinent art based on the teachings herein, any of numerous other mechanisms or devices that are currently known, or that later become known, equally may be employed to fixedly secure the top frame arm to the distal handle. As shown in FIG. 10B, the distal handle 14 further defines on its distal side a blade slot 82 that extends through the distal handle and is in communication with the frame arm recess 33 and top frame arm 10 received within the frame arm recess. The distal handle 14 further defines a fastener aperture 84 that extends laterally through the side wall of the handle and is in communication with the interior of the blade slot 82. In the illustrated embodiment, the fastener aperture 84 is threaded to receive a threaded fastener therein. As can be seen, the blade slot 82 is shaped and dimensioned to receive therethrough a hacksaw blade, or if desired, other types of blades, such as jab saw blades. As shown in FIG. 1, a bale screw 86 is threadedly received within the fastener aperture 84 such that the inner end of the bale screw is received within the interior of the blade slot 82. As described further below, the top frame arm 10 defines a hollow configuration such that spare hacksaw or other types of blades (such as jab saw blades) can be slidably received through the blade slot 82 and stored within the hollow frame and/or allowed to extend distally from the blade slot 82 for cutting a workpiece. When the spare blades are stored within the hollow frame 10, the bale screw 86 is threadedly received through the fastener aperture 84 and into the interior of the blade slot 82 to prevent the spare blade(s) within the hollow frame from the passing through the blade slot 82 and thus retaining the blades within the hollow frame. On the other hand, a blade can be allowed to extend through the blade slot 82 such that the distal end of the blade projects outwardly of the blade slot 82, and the proximal end of the blade is received within the blade slot 82. In this case, the bale screw 86 may threadedly engage the proximal end of the blade within the blade slot 82 to fixedly secure the blade and, in turn, use the distal end of the blade projecting from the blade slot 82 to cut a workpiece. The hacksaw blade in this position can be used to access tight workspaces within which the handles 12 and 14 would not fit, or otherwise to use, for example, a jab saw extending from the distal or front end of the frame. As may be recognized by those of ordinary skill in the pertinent art based on the teachings herein, the spare blade(s) may be retained within the hollow frame, and/or fixedly secured when projecting therefrom, in any of numerous different ways, or with any of numerous different devices, that are currently known, or that later become known. For example, a fastener other than a bale screw may be employed. In another exemplary embodiment, a manually-engageable, spring loaded device project laterally through the side wall of the frame to engage a blade projecting from the slot to fixedly secure the blade, or to block and retain the blades within the hollow frame.

Figure 11B:
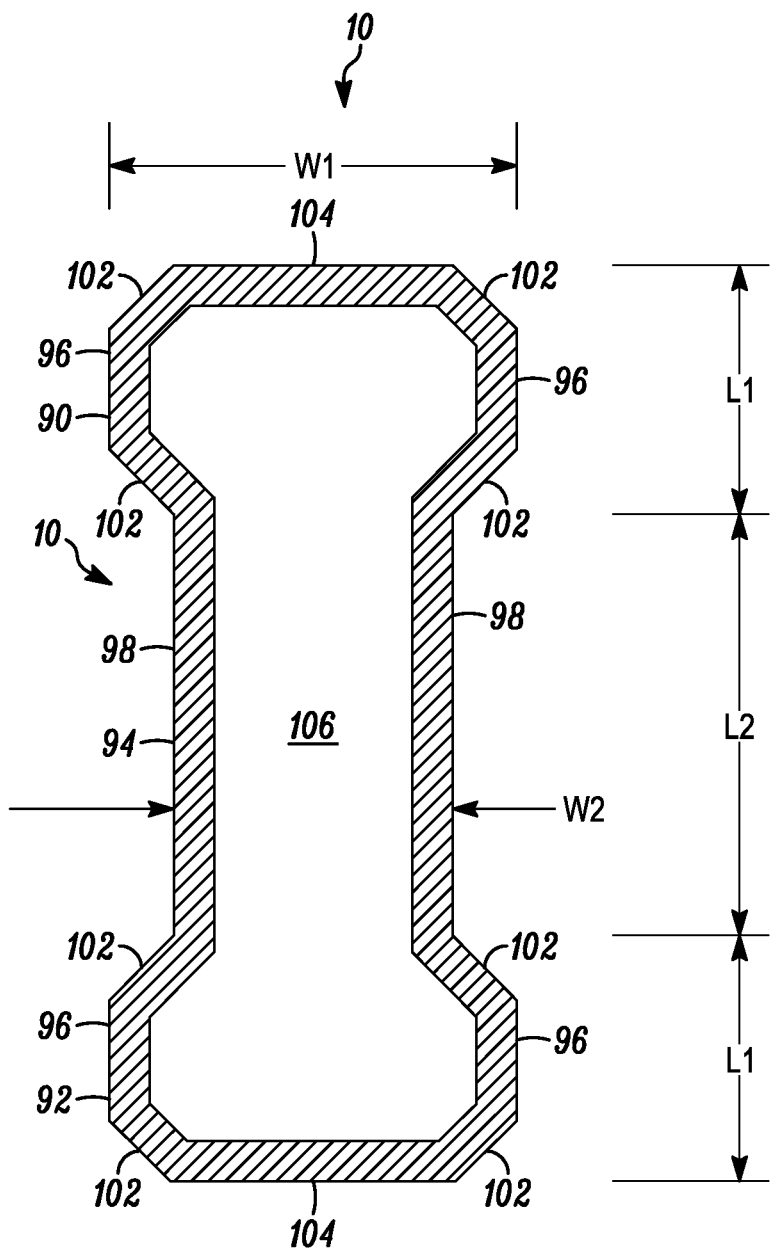
FIG. 11B is a cross-sectional view of the top frame arm of FIG. 11A

As shown best in FIG. 11A, the top frame arm 10 is formed in an axially-elongated arcuate shape defined by radius R, and as shown best in FIG. 11B, defines in cross-section a hollow I-beam shape. In the illustrated embodiment, the radius R is about 70 inches, and is preferably within the range of about 60 inches to about 85 inches. The top frame arm 10 defines axially-elongated straight segments extending from the ends of an axially-elongated arcuate shaped segment, which couple to the distal handle 14 and the proximal handle 12. In the illustrated embodiment, the straight segment that couples to the distal front handle 14 is about 2 inches, the arcuate shaped segment is about 6 inches, and the straight segment that couples to proximal handle 12 is about 3 inches. As may be recognized by those of ordinary skill in the pertinent art based on the teachings herein, the top frame arm 10 may take any of numerous different shapes or sizes that are currently known, or that later become known. For example, the radius of the axially-elongated arcuate shaped segment may not be constant (i.e., an axially-elongated arcuate shaped segment with a radius that varies along its length).

As shown in FIG. 11B, the hollow I-beam shape of the top frame arm 10 is defined by first and second expanded width portions 90 and 92, respectively, and a reduced within portion 94 extending between the expanded width portions 90 and 92. The expanded width portions 90 and 92 each define a first width W1, and the reduced width portion 94 defines a second width W2 that is less than the first width W1. In the illustrated embodiment, the first width W1 is about 0.52 inch, and the second width W2 is about 0.355 inch. Preferably, the first width W1 is within the range of about 0.75 inch to about 0.4 inch, and the second width W2 is within the range of about 0.25 inch to about 0.5 inch. As also shown in FIG. 11B, the expanded width portions 90 and 92 each define a first length L1, and the reduced width portion 94 defines a second length L2 that is greater than the first length L1. In the illustrated embodiment, the first length L1 is about 0.316 inch, and the second length L2 is about 0.824 inch. Preferably, the first length L1 is within the range of about 0.2 inch to about 0.5 inch, and the second length L2 is within the range of about 0.5 inch to about 1.5 inches. As further shown in FIG. 11B, the first and second expanded width portions 90 and 92, respectively, define substantially flat and substantially parallel opposing side walls 96, and the reduced width portion 94 similarly defines substantially flat and substantially opposing side walls 98. The first and second expanded width portions 90 and 92, respectively, further define chamfered outer and inner corners 102, and substantially flat and substantially parallel top and bottom walls 104. As also shown in FIG. 11B, the hollow I-beam further defines a substantially I-shaped cavity 106 that extends axially between the distal handle 14 and proximal handle 12 for receiving one or more spare blades therein.

One advantage of the hollow I-beam configuration of the top frame 10 is that it provides a hollow beam for receiving spare blades therein. Another advantage of the hollow I-beam, and particularly the hollow I-beam defining the axially elongated arcuate shape, is that it can provide significantly improved structural rigidity in comparison to prior art hollow beams that receive spare blades. Yet another advantage of the hollow I-beam configuration is that it can use significantly less material than a solid beam while nevertheless providing comparable structural rigidity. In the illustrated embodiment, the top frame arm 10 is steel and is formed by an extrusion process. As may be recognized by those of ordinary skill in the pertinent art based on the teachings herein, however, the particular material and method of manufacturing the top frame arm 10 is only exemplary, and any of numerous types of materials and/or manufacturing methods that are currently known or that later become known equally may be employed. For example, the top frame arm 10 may be made of aluminum, titanium, cast iron, rubber and/or plastics, and may be formed in any of numerous different ways, such as by extrusion or any of numerous different molding processes. As also may be recognized by those of ordinary skill in the pertinent art based on the teachings herein, the hollow I-beam need not take the specific shape illustrated in FIGS. 11A and 11B, but rather may define any of numerous different I-beam shapes that are currently known or that later become known. For example, the widths and/or lengths of the upper and lower expanded width portions need not be the same, the opposing walls of the I-beam need not be substantially flat or parallel, and/or the inner and/or outer corners of the I-beam need not be chamfered, but rather may be rounded or may define a more pointed corner shape.

As may be recognized by those of ordinary skill in the pertinent art based on the teachings herein, numerous changes and modifications may be made to the above-described and other embodiments of the present invention without departing from the scope of the invention as defined in the appended claims. For example, the distal handle, top frame arm, proximal handle, tensioning rocker arm, tensioning lever, tensioning rod, tensioning nut and/or tensioning spring may be formed of any of numerous different materials and may take any of numerous different configurations that are currently known or that later become known. Similarly, the mechanisms that prevent the tensioning lever and tensioning rod from axial translation may take any of numerous different forms, and/or may be formed of any of numerous different materials, that are currently known, or that later become known. In addition, the saw blades associated with the disclosed hacksaws may take the form of any of numerous different types of saw blades that are currently known or that later become known. Accordingly, this detailed description of currently preferred embodiments is to be taken in an illustrative, as opposed to a limiting sense.

What is claimed is:

1. A hacksaw comprising:
a frame assembly comprising:
an upper frame member comprising a proximal end and a distal end, the upper frame member defining an axially-elongated cavity therein, the axially elongated cavity configured to store an entirety of a blade therein;
a first handle fixedly secured to the proximal end of the upper frame member; and
a second handle fixedly secured to the distal end of the upper frame member, the second handle comprising:
a blade aperture extending through the second handle and in communication with the axially-elongated cavity, the blade aperture configured to receive the blade therethrough and into the axially-elongated cavity;
a device aperture disposed through a wall of the second handle; and
a device, wherein at least a portion of the device is configured to extend through the device aperture and into the blade aperture;
wherein in a first blade configuration, the device is configured to retain the blade fully within the axially-extending cavity and prevent the blade from passing through the blade aperture; and
wherein in a second blade configuration, the device is configured to releasably engage and secure the blade with a first end of the blade projecting outwardly from the blade aperture of the second handle and a distal second end of the blade received within the axially-elongated cavity.

2. A hacksaw as defined in claim 1, wherein the device is a fastener.

3. A hacksaw as defined in claim 1, wherein the device is spring-loaded.

4. A hacksaw as defined in claim 1, wherein the device extends laterally through a sidewall of the second handle and, wherein a portion of the device is in communication with the axially-elongated cavity.

5. A hacksaw as defined in claim 1, wherein the upper frame member defines a hollow I-beam cross-sectional configuration.

6. A hacksaw as defined in claim 5, wherein, the upper frame member defines a first expanded width hollow portion defining a first width and first length, a second expanded width hollow portion defining a second width and a second length and spaced from the first expanded width hollow portion, and a reduced width hollow portion extending between the first and second expanded width portions, and defining a third width less than the first and second widths, and third length greater than the first and second lengths.

7. A hacksaw as defined in claim 1, further comprising the blade, wherein the blade is moveable between a first position in the first blade configuration wherein the blade is located fully within the axially-elongated cavity and a second position in the second blade configuration wherein the blade is releasably engaged and secured by said device so that the first end of the blade projects outwardly from the blade aperture and the second end of the blade is received within the axially-elongated cavity.

* * * * *